US009566205B2

(12) United States Patent
Patoglu

(10) Patent No.: US 9,566,205 B2
(45) Date of Patent: Feb. 14, 2017

(54) SERIES ELASTIC HOLONOMIC MOBILE PLATFORM FOR UPPER EXTREMITY REHABILITATION

(71) Applicant: SABANCI ÜNIVERSITESI, Tuzla, Istanbul (TR)

(72) Inventor: Volkan Patoglu, Istanbul (TR)

(73) Assignee: SABANCI ÜNIVERSITESI, Istanbul (TR)

( * ) Notice: Subject to any disclaimer, the term of this patent is extended or adjusted under 35 U.S.C. 154(b) by 0 days.

(21) Appl. No.: 14/783,879

(22) PCT Filed: Apr. 11, 2014

(86) PCT No.: PCT/EP2014/057383
§ 371 (c)(1),
(2) Date: Oct. 12, 2015

(87) PCT Pub. No.: WO2014/167099
PCT Pub. Date: Oct. 16, 2014

(65) Prior Publication Data
US 2016/0051433 A1    Feb. 25, 2016

(30) Foreign Application Priority Data
Apr. 12, 2013 (EP) .................................. 13163607

(51) Int. Cl.
*B25J 9/16* (2006.01)
*A61H 1/00* (2006.01)
*B25J 9/00* (2006.01)

(52) U.S. Cl.
CPC ............. *A61H 1/005* (2013.01); *B25J 9/0048* (2013.01); *B25J 9/162* (2013.01); *B25J 9/1607* (2013.01);

(Continued)

(58) Field of Classification Search
CPC ..................... G05B 2219/45109; A61B 34/30; A61B 34/70; B25J 9/1694; B25J 9/162; A61H 1/005

See application file for complete search history.

(56) References Cited

U.S. PATENT DOCUMENTS 7,426,970 B2 * 9/2008 Olsen .................... A61G 5/046
180/65.1

OTHER PUBLICATIONS

John Hu et al: "An advanced medical robotic system augmenting healthcare capabilities—robotic nursing assistant", Robotics and Automation (ICRA). 2011 IEEE International Conference On, IEEE, May 9, 2011 (May 9, 2011), pp. 6264-6269.

(Continued)

*Primary Examiner* — Karen Masih
(74) *Attorney, Agent, or Firm* — Epstein Drangel LLP; Robert L. Epstein

(57) ABSTRACT

It is proposed a design and control of series elastic holonomic mobile platform, aimed to administer therapeutic table-top exercises to patients who have suffered injuries that affect the function of their upper extremities. The proposed mobile platform is a low-cost, portable, easy-to-use rehabilitation device for home use. It consists of four actuated Mecanum wheels and a compliant, low-cost, multi degree-of freedom Series Elastic Element as its force sensing unit. Thanks to its series elastic actuation, it is highly backdriveable and can provide assistance/resistance to patients, while performing omni-directional movements on plane. The device helps improving accuracy and effectiveness of repetitive movement therapies completed at home, while also providing quantitative measures of patient progress.

13 Claims, 6 Drawing Sheets

Figure 1:
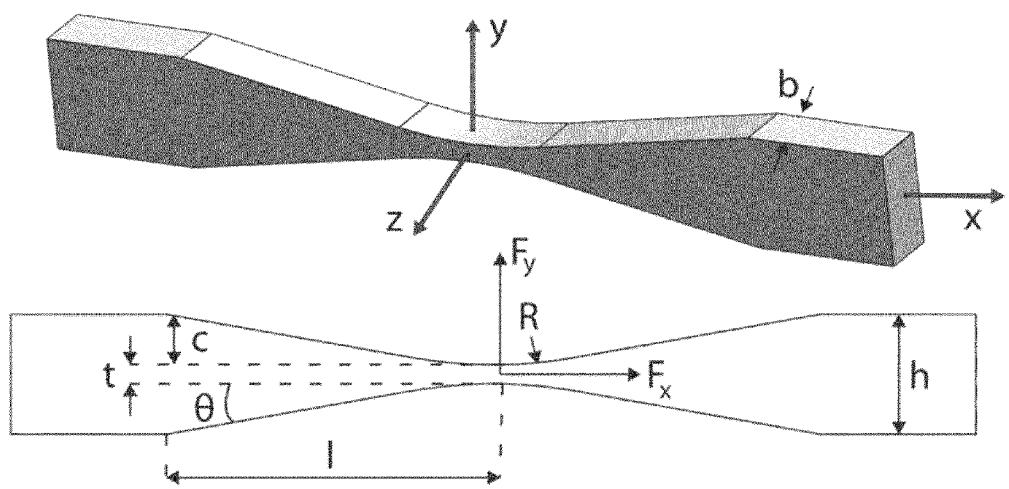

(52) U.S. Cl.
CPC ............ *B25J 9/1623* (2013.01); *B25J 9/1633* (2013.01); *B25J 9/1694* (2013.01); *G05B 2219/39186* (2013.01); *G05B 2219/40279* (2013.01); *G05B 2219/40587* (2013.01); *G05B 2219/45109* (2013.01)

(56) References Cited

OTHER PUBLICATIONS

Emma Campbell et al: "Design of a low-cost series elastic actuator for multi-robot manipulation", Robotics and Automation (ICRA), 2011 IEEE International Conference On, IEEE, May 9, 2011 (May 9, 2011). pp. 5395-5400.

Jakob Oblak et al: "Universal Haptic Drive: A Robot for Arm and Wrist Rehabilitation", IEEE Transactions on Neural Systems and Rehabilitation Engineering, IEEE Service Center, New York, NY, US, vol. 18, No. 3, Jun. 1, 2010 (Jun. 1, 2010), pp. 293-302.

Byoung Hun Kang et al: "Analysis and design of parallel mechanisms with flexure joints". Robotics and Automation. 2004, Proceedings ICRA '04, 2004 IEEE International Conference on New Orleans, LA, USA Apr. 26-May 1, 2004, Piscataway, NJ USA, IEEE US, Apr. 26, 2004 (Apr. 26, 2004), p. 4097.

Tian Y et al: "Three flexure hinges for compliant mechanism designs based on dimensionless graph analysis", Precision Engineering. Elsevier, Amsterdam, NL, vol. 34, No. 1, Jan. 1, 2010 (Jan. 1, 2010), pp. 92-100.

Jonathon W Sensinger et al:"Unconstrained Impedance Control Using a Compact Series Elastic Actuator", Mechatronic and Embedded Systems and Applications, Proceedings of the 2nd IEEE/ASME International Conference on IEEE, PI, Aug. 1, 2006 (Aug. 1, 2006) pp. 1-6.

\* cited by examiner

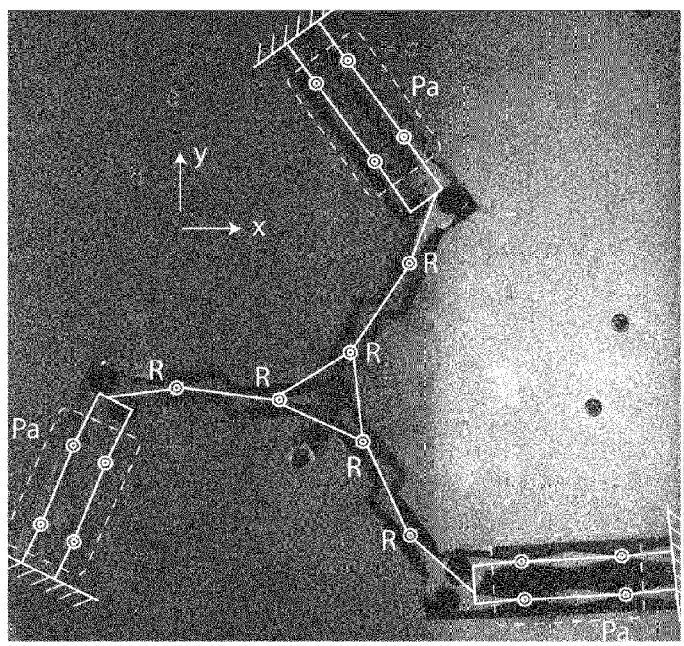
Fig. 3b
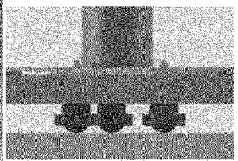
Fig. 3c
Fig. 3d
Fig. 3a

SERIES ELASTIC HOLONOMIC MOBILE PLATFORM FOR UPPER EXTREMITY REHABILITATION

Neurological injuries are the leading cause long-term disabilities that restrict daily functions of millions of patients. Physical rehabilitation therapy is indispensable for treatment of neurological disabilities. Rehabilitation therapies are shown to be more effective when they are repetitive, intense, long term and task specific. However, manual administration of such therapies is costly due to the physical burden and the manual labour involved.

Utilization of robotic devices for delivery of repetitive and physically involved rehabilitation exercises not only eliminates the physical burden of movement therapy for the therapists, but can motivate patients to endure intense therapy sessions thanks to integration of multi-modalities, while simultaneously reducing the treatment costs. Robot-assisted rehabilitation devices increase the reliability and accuracy of treatment, while also providing quantitative measurements to track the patient progress. Clinical trials investigating efficacy of robotic rehabilitation provide evidence that robotic therapy is effective for motor recovery and possesses high potential for improving functional independence of patients.

Active rehabilitation devices can be applied to patients with all levels of impairment to provide customized, interactive treatment protocols. In particular, these devices enable active participation of patients by assisting patients only as-needed and render easy tuning of duration and intensity of therapies feasible. Furthermore, low cost and portable rehabilitation robots can be employed for home based therapy, and hold the promise to increase the accessibility of physical therapy, while allowing administration of safe and precise exercises. The present invention presents a low-cost, active, omni-directional mobile platform for home-based administration of table-top therapeutic physical rehabilitation exercises to patients who have suffered injuries that affect the function of their upper extremities.

Robots designed for upper limb rehabilitation can be loosely categorized as exoskeleton and end-effector type devices. Exoskeleton type robots correspond with human joints; therefore, are effective in delivering specific joint therapies. In particular, exoskeletons are capable of applying controlled torques to individual joints and measuring movements of specific joints decoupled from movements of other joints. Many successful implementations of exoskeleton type upper limb rehabilitation robots have been developed in the literature. In spite of the advantages of exoskeleton type robots, home based utilization of these devices are not quite feasible, since, due to the inherent mechanical complexity in their designs, exoskeleton robots are typically very expensive.

End-effector type rehabilitation robots do not correspond with human joints, but administer controlled therapeutic movements at the end-effector of the device, where the human limb is attached. Therefore, without external restraints on the joints, joint specific therapies are not achievable with such mechanisms. However, end-effector type robots are advantageous thanks to their relatively simpler kinematic structure and lower cost. Moreover, several of these devices are portable and suitable for home use. With respect to their portability, end-effector type rehabilitation robots can further be categorized into fixed-base robots and mobile devices. A well-known example of fixed-base robots is the MIT-Manus (H. Krebs, M. Ferraro, S. Buerger, M. Newbery, A. Makiyama, M. Sandmann, D. Lynch, B. Volpe, and N. Hogan, "Rehabilitation robotics: pilot trial of a spatial extension for MIT-Manus," Journal of Neuro Engineering and Rehabilitation, vol. 1, no. 5, 2004). MIT-Manus is an impedance-type robot that possesses two grounded direct-drive motors to provide torques to assist or resist patient movements. Another example of fixed-base devices is Gentle/S (R. Loureiro and W. Harwin, "Robot aided therapy: Challenges ahead for upper limb stroke rehabilitation," in International Conference on Disability, Virtual Reality and Associated Technologies, 2004), which uses an admittance-type robot (P. Lammertse, E. Frederiksen, and B. Ruiter, "The hapticmaster, a new high-performance haptic interface," in Eurohaptics, 2002.) along with a gimbal mechanism to connect to the human wrist. Reha-Slide is another fixed base device which is designed to administer resistive movement therapies (S. Hesse, H. Schmidt, C. Werner, C. Rybski, U. Puzich, and A. Bardeleben, "A new mechanical arm trainer to intensify the upper limb rehabilitation of severely affected patients after stroke: Design, concept and first case series." Eura Medicophys, vol. 43, no. 4, pp. 463-8, 2007). Even though fixed-base end-effector type rehabilitation robots have been shown to be effective in delivering therapies in a clinical setting, their adaptation for home-based therapy is not very feasible.

A robotic nursing assistant is disclosed by John Hu et al in a journal titled "An advanced medical robotic system augmenting healthcare capabilities—robotic nursing assistant" during Proceedings 2011 IEEE International Conference on Robotics and Automation on May 9, 2011 among pages 6264-6269, XP032034034.

In contrast to the fixed-base devices, rehabilitation robots based on mobile platforms can be designed to be compact and portable; therefore, such devices hold high promise for enabling home based robotic therapy. Since these devices can be implemented with much lower manufacturing costs, their wide-spread availability becomes feasible. Several low-cost, home-based rehabilitation robots have been designed in the literature. A well-known low-cost, mobile device is the arm skate (Y. Chen, T. Kuo, and W. Chang, "Aid training system for upper extremity rehabilitation," in Int. Conference of the IEEE Engineering in Medicine and Biology Society, vol. 2, 2001, pp. 1360-1363), which is a passive device equipped with reed-relays and magnets. In this robot, reed relays are utilized to link objects defined in a virtual environment with the physical environment and to determine the robot position. Since the magnetic set-up is expensive and a special platform is required with reed relays, a later implementation of this robot excludes reed-relays in favour of electromagnetic brakes attached to four omni-directional wheels so that the device can provide resistance to the patients whenever required. Another example of low-cost table-top devices is Rutgers Arm II (G. Burdea, D. Cioi, J. Martin, D. Fensterheim, and M. Holenski, "The Rutgers Arm II Rehabilitation System—A feasibility study," IEEE Transactions on Neural Systems and Rehabilitation Engineering, vol. 18, no. 5, pp. 505-514, 2010), a mobile device that uses teflon balls to slide over a table. In order to provide assistance or resistance to the patient, the table is manually tilted to employ gravity to provide the required power. The movement of physical system is measured using cameras and displayed in a virtual environment. Unfortunately, manual use of gravity field restricts the available assistance/resistance that can be provided to a very limited spectrum. ARMassist is another low-cost mobile platform for upper-limb rehabilitation (J. Perry, H. Zabaleta, A. Belloso, C. Rodriguez-de Pablo, F. Cavallaro, and T. Keller, "ARMassist: Development of a functional prototype for at-home telerehabilitation of post-stroke arm impairment," in IEEE International Conference on Biomedical Robotics and Biomechatronics, 2012, pp. 1561-1566). The novelty of ARMassist is the use of a force sensor to measure the human forces along the out-of-plane direction. Although one of the future goals of this robot is to provide assistance to the patient, the current version of the system is passive with three omni-directional wheels allowing planar movements. Three optical flow sensors are utilized to determine the planar configuration of the robot, while global positioning is achieved through a mat with special pattern. Even though passive mobile platforms are low-cost and potentially effective in motivating patients and providing quantitative measures of patient progress, these devices are limited in that they cannot assist patients to help them complete the task, provide force-feedback to restrict unwanted, potentially hazardous deviations for the desired trajectories, or allow for online adjustment of the intensity of the therapies. Neither can these devices be applied to patients with all levels of impairment. Other portable passive rehabilitation systems suitable for home use include Wii remotes and infrared cameras integrated with virtual reality games, such as pick-and-place tasks.

MOTORE (C. A. Avizzano, M. Satler, G. Cappiello, A. Scoglio, E. Ruffaldi, and M. Bergamasco, "MOTORE: A Mobile Haptic Interface for Neuro-Rehabilitation," in IEEE International Symposium on Robot and Human Interactive Communication, 2011, pp. 383-388) is an active mobile robot designed for upper-limb rehabilitation. The movement is provided by three actuated omni-directional wheels. Two load cells are placed at the handle of the device so that in-plane forces can be measured and admittance controllers can be implemented during trajectory tracking tasks. Reha-Manus (D. Luo, M. Roth, C. Wiesener, T. Schauer, H. Schmidt, and J. Raisch, "Reha-Manus: A novel robot for upper limb rehabilitation," in Work-shop Automatisierungstechnische Verfahren fur die Medizin (AUTOMED), 2010, pp. 33-34) is another example of fully active position controlled holonomic mobile platform designed for upper limb therapy. This robot is based on three omni-directional wheels driven by geared motors equipped with optical encoders, and features a three DoF force sensor. Since actuated holonomic mobile platforms with omni-directional wheels are passively non-backdriveable, force sensing is required to ensure safe physical interactions with patients. Both Reha-Manus and MOTORE rely on force sensors to achieve active backdriveability via force/admittance control. However, use of force sensors significantly decrease the simplicity and affordability of these devices for home-based rehabilitation, since force sensors necessitate significant signal conditioning and high-precision force sensors are of high cost. Besides, explicit force control is vulnerable to instability due to sensor actuator non-collocation imposed by the higher order dynamics of the system.

The present invention proposes an active holonomic mobile platform based multi degrees of freedom (DoF) series elastic actuator, to administer therapeutic table-top exercises to patients who have suffered injuries that affect the function of their upper extremities. In particular, the mobile platform of the invention consists of a 3-DoF planar, compliant parallel mechanism coupled to an omni-directional Mecanum-wheeled mobile robot. The implementation of the invention is advantageous in that it provides the deliberate introduction of a multi-DoF compliant element between the mobile multi-DoF actuation unit and the patient, which transforms the non-backdriveable active holonomic platform into a multi-DoF series elastic actuator. Series elastic actuation not only eliminates the need for costly force sensors, but also enables implementation of closed loop force control with higher controller gains, providing robustness against imperfections in the power transmission and allowing lower cost drive components to be utilized. The result is a low-cost active rehabilitation device with an unlimited planar workspace, especially well-suited for home-based therapies. In addition to administering active, passive and resistive therapeutic exercises, the implementation of the present invention can assist-as-needed, that is, can interactively adjust the amount of assistance, to help increase the training efficiency by ensuring active participation of patients.

In the literature, it has been shown that inherent compliance of robotic manipulators introduces non-collocation between force sensors and actuators and imposes an upper limit on the loop gain of the closed-loop explicit force control. This inevitable stability limit on the loop gain significantly limits the explicit force controller gains, especially when stiff force sensors are utilized. Utilization of either soft couplings or soft sensors has been proposed to improve the stability of the closed-loop force control system. Series elastic actuation (SEA) is as an example of such force control techniques with soft force sensors.

SEA deliberately introduces a compliant element between the actuator and the environment, then measures and controls the deflection of this compliant element. That is, SEA transforms the force control problem into a position control problem that can be addressed using well established motion control strategies.

SEA for force control is advantageous, since it alleviates the need for high-precision force sensors/actuators and allows for precise control of the force exerted by the actuator through typical position control of the deflection of the compliant coupling element. Another benefit of SEA is the low output impedance of the system at the frequencies above the control bandwidth, avoiding hard impacts with environment. That is, while SEA can ensure back driveability though active control at frequencies below the control bandwidth, it also possesses a certain level of passive backdriveability for excitations above the control bandwidth, ensuring safety and robustness throughout the whole frequency spectrum. Another, very important, advantage of SEA is its ability to achieve higher controller gains with respect to explicit force controllers. Given the upper limit on the loop gain which is directly proportional to the controller gains and the plant stiffness, the controller gains of SEA can be set to values orders of magnitude higher than typical force controllers, since the stiffness of an SEA is significantly lower than a typical force sensor. Hence, using SEA offers implicit superiority such that the accuracy of the force control is not limited by the actuator itself, while the closed loop system enjoys better disturbance rejection characteristics. Consequently, SEA not only eliminates the need for costly force sensors, but also enables implementation of closed loop force control with higher controller gains, providing robustness against imperfections in the power transmission and allowing lower cost drive components to be utilized.

The main disadvantage of SEA is its relatively low bandwidth due to the intentional introduction of the soft coupling element. The force resolution of an SEA improves as the coupling is made more compliant; however, increasing compliance decreases bandwidth of the control system, trading off response time for force accuracy. Even though low bandwidth of SEA limits haptic rendering performance, this does not pose an important concern for rehabilitation robots, since high fidelity rendering is not an objective and the device bandwidth can still be kept significantly higher than that of patients to provide adequate levels of haptic assistance.

Accompanying drawings are given solely for the purpose of exemplifying the technical approach of the present invention whose advantages were outlined above and will be explained hereinafter in brief.

The drawings are not meant to delimit the scope of protection as identified in the claims nor should they be referred to alone in an effort to interpret the scope identified in said claims without recourse to the technical disclosure in the description of the present invention.

FIG. 1 demonstrates geometric parameters of and forces acting on a filleted V-shaped flexure hinge according to the present invention.

Figure 2:
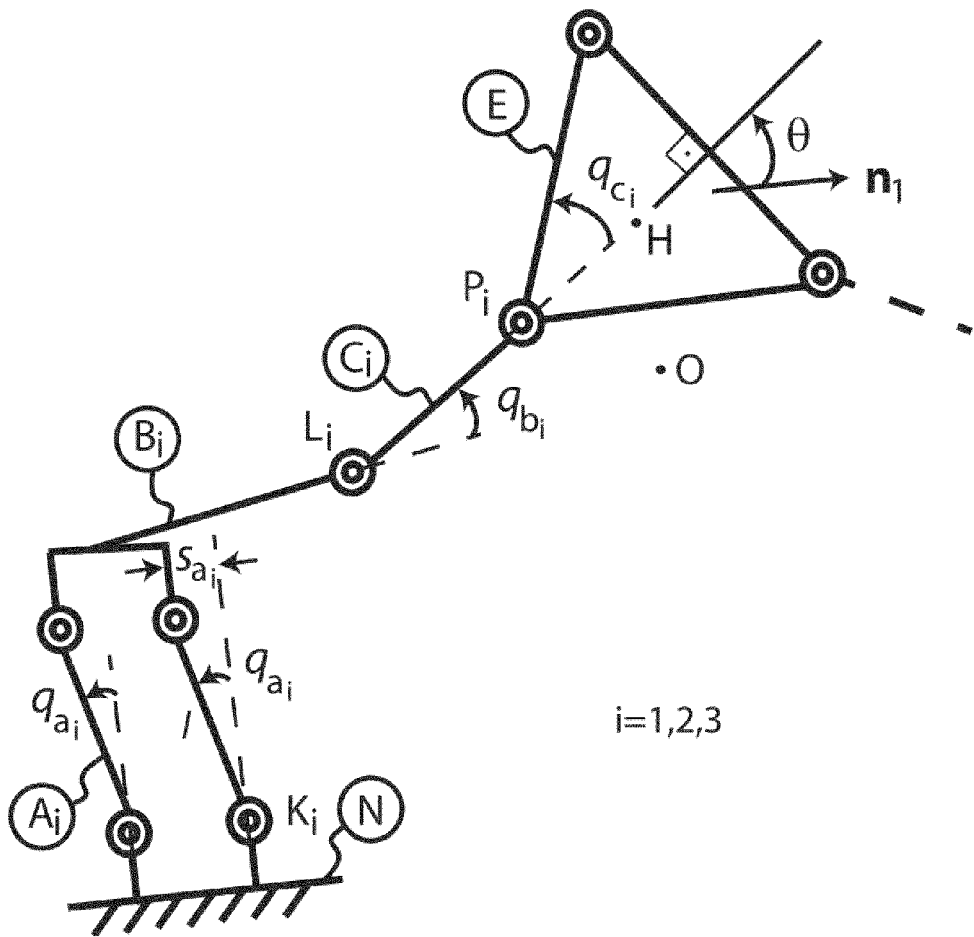

FIG. 2 demonstrates pseudo-rigid body model of 3-PaRR mechanism according to the present invention.

FIGS. 3a to 3d demonstrates monolithic implementation of compliant 3-PaRR mechanism and constraints against out-of-plane movements where FIGS. 3b to 3d demonstrate top perspective, side and bottom perspective views respectively.

Figure 4:
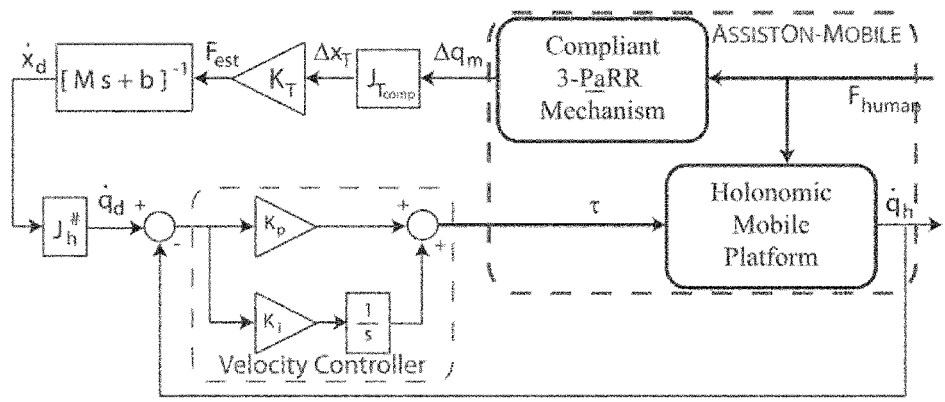

FIG. 4 demonstrates cascaded controller of the mobile platform according to the present invention.

Figure 5:
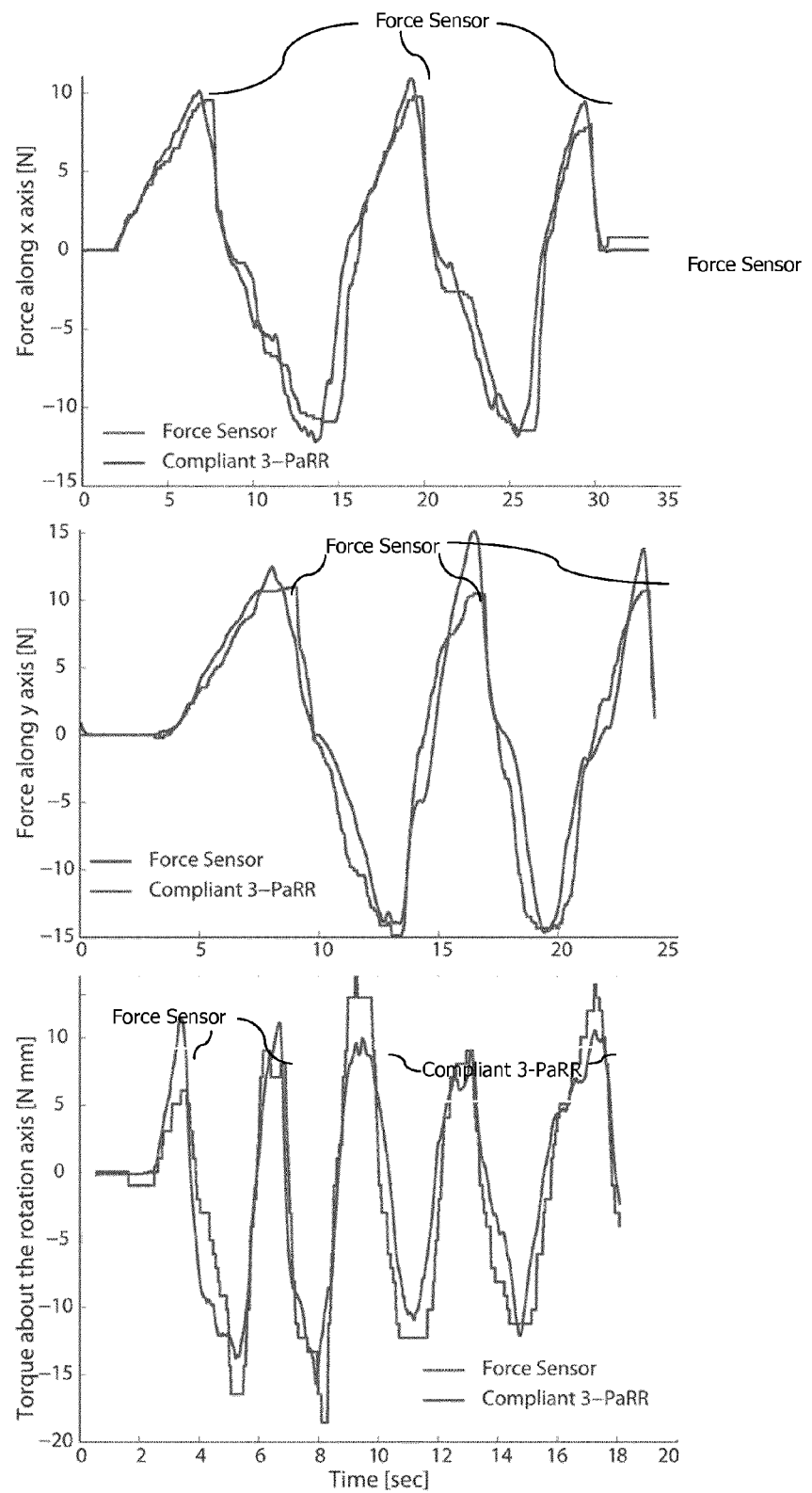

FIG. 5 demonstrates measurements of the force sensor along with the force estimates through the compliant element along x, y and θ directions.

Figure 6:
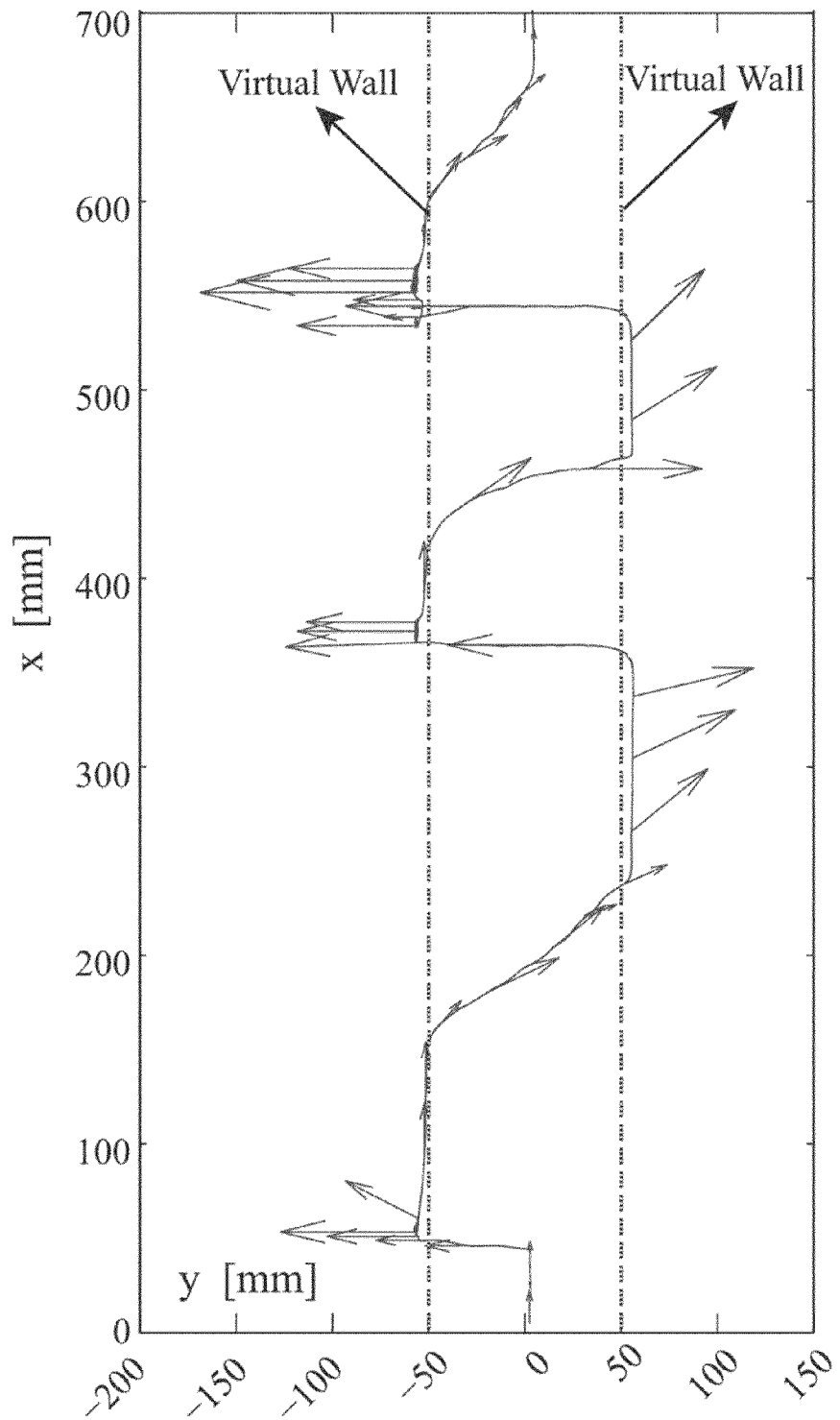

FIG. 6 demonstrates Path followed along with forces applied throughout the motion where dashed lines depict the virtual wall boundaries while arrows show the magnitude and direction of applied forces.

The mobile platform according to the present invention consists of a compliant parallel mechanism coupled to a Mecanum-wheeled mobile robot capable of omni-directional (3-DoF planar) movement.

Since the Mecanum-wheeled mobile base of mobile platform according to the present invention acts as a 3 DoF actuator in plane, a 3 DoF compliant element is required such that a multi-DoF SEA can be implemented. The present invention proposes to use a compliant planar mechanism as a low-cost means of measuring the in-plane forces and torque acting on the robot, by measuring deflection of this compliant mechanism with position sensors. Planar compliant mechanisms are preferred since they are easy to manufacture as monolithic structures, and free of parasitic effects such as friction, backlash. To implement the compliant element of device according to the invention, a parallel mechanism based design is adopted, since parallel mechanisms are more robust against manufacturing errors and dimensional changes due to thermal noise. The errors at the joint level are averaged at the end effector; therefore, parallel mechanisms can achieve more precise motion than their serial mechanism counterparts. Moreover, parallel mechanisms can be designed to be more compact with higher out-of-plane stiffness, compared to serial mechanisms. Parallel mechanisms are also advantageous since they allow for grounding of position sensors.

In particular, a compliant planar 3-PaRR parallel mechanism is adopted as the underlying kinematic structure of the compliant element. In this mechanism, the position of the output links of the compliant parallelogram (Pa) mechanism is measured with respect to the base link. The revolute joints of the compliant mechanism are designed as filleted V-shaped flexure hinges, while parallelogram mechanisms with such revolute joints are utilized to implement compliant prismatic joints. V-shaped flexure hinges are selected since they provide better rotational precision than other flexure hinge types. In particular, since the largest elastic deformation of the hinge occurs at the point of minimum thickness, the rotation axis V-shaped flexure hinges can be determined with high precision. To lower stress concentration while increasing range of rotation; the corners of V-shaped cutouts are filleted by a fixed angle. The V-shaped filleted flexure hinge is shown in FIG. 1, where b is the width, h denotes the height, t represents the minimum thickness, and I signifies the half length of the flexure hinges. The symbol c is the height of the profile that is equal to (h−t)/2, while R is the radius of circular section, and θ denotes the separation angle of the profile from horizontal axis. The deflection of the filleted V-shaped flexure hinge under bending moments can be analytically calculated as $$\frac{\alpha_z}{M_z} = \frac{3}{2EbR^2}\left\{\frac{1}{2\beta+\beta^2}\left\{\frac{(1+\beta)\sin\theta}{(1+\beta-\cos\theta)^2} + \frac{(3+2\beta+\beta^2)\sin\theta}{(2\beta+\beta^2)(1+\beta-\cos\theta)} + \frac{6(1+\beta)}{(2\beta+\beta^2)^{3/2}}\arctan\left(\sqrt{\frac{2+\beta}{\beta}}\tan\frac{\theta}{2}\right)\right\} - \frac{\gamma^2\cot\theta}{\beta^2(1+\gamma)^2} + \frac{\cot\theta}{(1+\beta-\cos\theta)^2}\right\} \quad (1)$$

where $\beta=t/2R$ and $\gamma=t/2c$. Here, $\alpha_z$ represents the angular displacement and $M_z$ denotes the bending moment about z axis. The maximum deflection of filleted V-shaped flexure hinge can be calculated by matching the maximum bending moment with the yield stress of the selected material. The joint stiffness of filleted V-shaped flexure hinges are given as:

$$K_{joint} = \left(\frac{M_z}{\alpha_z}\right) \quad (2)$$

where E is the Youngs modulus of the selected material. In the design of the implementation according to the invention, each filleted V-shaped flexure hinge is designed to have 2.75° maximum angular deflection and 1 Nm/rad joint stiffness.

The analysis of compliant mechanisms is significantly harder than the analysis of their rigid body counterparts, since the study of these mechanisms require the determination of their deformations under externally applied forces. According to the present invention, an approximate model, namely the pseudo-rigid body model, is used to study the kinematics of the compliant planar 3-PaRR parallel mechanism. Pseudo-rigid body model is preferred due to its computational efficiency and ease of use. A pseudo-rigid body approximates the motion of a compliant mechanism by replacing its flexible links with rigid links and introducing torsional springs at both ends of such rigid ones.

A schematic representation of the pseudo-rigid body model of compliant planar 3-PaRR parallel mechanism is depicted in FIGS. 2 and 3. In this figure N represents the base reference frame, while E denotes the end-effector frame. Point H is where the handle is attached and is located at the centre of the end-effector. Point O marks the centre of the workspace. Bodies $A_i$, $B_i$, and $C_i$, for i=1, 2, 3 respectively, denote the three bodies on each leg that connects the end-effector E to the ground N, while $K_i$, $L_i$, and $P_i$ mark the centres of revolute joints. To study the kinematics of 3-PaRR, three vector loop equations can be written in plane as follows:

$$\vec{r}^{OK_i} + \vec{r}^{K_iL_i} + \vec{r}^{L_iP_i} + \vec{r}^{P_iH} - \vec{r}^{OH} = \vec{0} \quad (3)$$

where $\vec{r}$ represents the position vector from the left superscript to the right superscript and i=1, 2, 3 is the loop index. It is possible to derive six independent scalar equations from these three planar vector loop equations, while three more independent scalar equations can be derived from the relationship between joint rotations and the end-effector rotations. These equations can be solved analytically to determine all nine joint angles $q_{ai}$, $q_{bi}$, and $q_{ci}$, for i=1, 2, 3, which are required to calculate the task space stiffness of the device. However, since the defections of the compliant mechanism is relatively small, differential kinematics of the device dominate its movements. In particular, determining the initial configuration of the device together with its Jacobian matrix is sufficient to resolve its kinematics. The Jacobian of the model can be calculated by differentiating the vector loop equations in Eqn (3) in N and solving together with the angular velocity equations $$\Delta\theta = \Delta q_{b_i} + \Delta q_{c_i} \quad (4)$$

where $\Delta$ signifies small quantities and i=1, 2, 3. The resulting Jacobian can be partitioned into kinematic Jacobian $J_T$, which gives the relation between the joint space and task space velocities, and the constraint Jacobian $J_C$, which imposes the motion constraints to the system. The kinematic and constraint Jacobian matrices can further be grouped by the type of the joint: measured or passive. This form of the Jacobian matrix provides more insight about the system, since the sub-blocks of the matrix clearly reflects the contributions of the measured and passive joints. The Jacobian matrix is explicitly expressed as $$\begin{bmatrix} \Delta x_T \\ 0 \end{bmatrix} = \begin{bmatrix} J_{T_m} & J_{T_p} \\ J_{C_m} & J_{C_p} \end{bmatrix} \begin{bmatrix} \Delta q_m \\ \Delta q_p \end{bmatrix} \quad (5)$$

where $J_{Tm}$, is the Jacobian matrix for unconstrained measured joints, $J_{T_p}$ is the Jacobian matrix of unconstrained passive joints, $J_{C_m}$ is the Jacobian matrix for constrained measured joints and $J_{C_p}$ is the Jacobian matrix for constrained passive joints, while $\Delta q_{mc}$ and $\Delta q_{pa}$ represent small displacement of measured and passive joints, and $\Delta x_T$ denotes the small configuration changes of the end-effector. In 3-PaRR case, the position of the output links of three grounded parallelogram mechanisms (that effectively act as prismatic joints) are measured, while all the remaining revolute joints are passive. The joint angles of compliant parallelogram linkages are calculated from the as:

$$q_{m_i} = \sin^{-1}(s_{m_i}/l) \quad (6)$$

where $s_{ai}$ is the measured linear displacement, i=1, 2, 3 and l is the length of body $A_i$.

Using the Jacobian matrices, the relationship between measured joint displacement and the task space displacement of the endeffector can be derived as:

$$\Delta x_T = (J_{T_m} - J_{T_p} J_{C_p}^{-1} J_{C_m})\Delta q_m \quad (7)$$

$$= J_{T_{comp}} \Delta q_m$$

where $J_{T_{comp}}$ denotes the Jacobian matrix of the overall compliant mechanism. Once the Jacobian matrix of the compliant 3-PaRR mechanism is obtained, the task space stiffness matrix $K_T$ of the mechanism can be derived as:

$$K_T = J_{T_{comp}}^{-T}(K_{q_m} + J_{C_m}^T K_{C_p}^{-T} K_{q_p} J_{C_p}^{-1} J_{C_m}) J_{T_{comp}}^{-1} \quad (8)$$

where $K_{q_m}$ and $K_{q_p}$ are the individual stiffness values of measured and passive joints.

The monolithic physical implementation of 3-PaRR mechanism based compliant element is shown on the left side of FIG. 3. The prismatic joints of the compliant mechanism are instrumented with linear incremental optical encoders with 2000 counts per inches resolution under quadrature decoding. For this 3-PaRR compliant mechanism with V-shaped flexure hinges, $K_{qm} = K_{qp} = K_{joint}$ are calculated as 0.014 Nm/rad following Eqn (2). The diagonal terms of task space stiffness reads as $K_{Tx} = K_{Ty} = 14$ N/mm along x and y directions and $K_{r\theta} = 4.4$ Nm/rad about the rotation axis, while the off diagonal terms are negligibly small. Out of-plane movements of the compliant mechanism are restricted as depicted on the right side of FIG. 3. In particular, three spherical rollers are attached to bottom side of the end-effector of the compliant element and these rollers are constrained to the planar surface of the holonomic platform from the top to counter-balance out-of-plane forces and moments applied by the patient.

The mobile platform implementation according to the present invention possesses a rectangular shape of 340 mm×160 mm×85 mm. The footprint of the robot is designed so that the forearm and wrist can be comfortably placed on the robot, relieving patients from the burden of supporting the weight of their own arm. The mobile robot is aimed to be used as a table top device and possesses 3 DoF (2 DoF translations and 1 DoF rotation) to sustain all possible planar movements. The robot is chosen as of holonomic type, so that all of its DoF can be independently controlled. Although only three actuators are sufficient to independently span all DoF on a plane, the mobile platform is designed to use four actuators. Redundant actuation is preferred since it allows for lower power DC motors be utilized to achieve high forces/torques outputs at the task space of the robot. Furthermore, with a four wheeled design, the holonomic movement can be achieved using Mecanum wheels—omni-directional wheels with 45 degrees angled rollers—that can provide enhanced traction and smoother motion. It is submitted that Mecanum wheeled robots can handle slipping better than three wheeled holonomic robot designs. Since the robot is equipped with four wheels, the design integrates a suspension system to ensure that all wheels are in contact with the ground at all times. Specifically, the suspension springs are chosen among the commercially available suspension components for RC cars and have 10 mm stroke. The connection parts and upper body of the robot are manufactured from aluminium. The actuators of the mobile robot are chosen as brushed DC motors with 180 mNm continuous torques. The power generated by the motors is transmitted to the wheels via a belt driven transmission with a torque amplification ratio of 1:3.5. The position of the robot is estimated through dead reckoning based on optical encoders located at the motor axes. Even though the actuators are backdriveable, the mobile robot is not, due to the Mecanum wheels. Therefore, the robot is equipped with the series elastic element detailed as previous so that backdriveability can be achieved through active control.

To ensure backdriveability of the implementation according to the invention under the action of forces applied by the patient at the end-effector of the compliant mechanism, a real-time controller is implemented. The block diagram of the closed loop SEA system is presented in FIG. 4, where physical variables are marked with thicker lines. In this cascaded structure, there is an inner velocity control loop and an outer force/admittance control loop. The inner loop of the control structure deals with imperfections, such as friction, stiction, rendering the system into an ideal velocity source. As the outer loop, an admittance controller is implemented. In particular, in FIG. 4, $F_{human}$ represents the forces applied by the patients, $\tau$ is the torques applied by the actuators of the holonomic mobile platform, while $\dot{q}_h$ denotes the velocities of these actuators. Symbols $K_p$ and $K_i$ denote the PI gains of the inner-loop velocity controller of the mobile platform, whereas M and b represent the parameters of the desired admittance. Symbol $K_T$ is the task space stiffness, while $J_{Tcomp}$ represents the overall Jacobian of the compliant 3-PaRR mechanism. Finally, $J_h$ is the Jacobian of the holonomic platform, while $J_h^{\#}$ represents its pseudo-inverse. According to FIG. 4, the forces applied to the end-effector of the compliant mechanism result in displacements measured by linear encoders attached to its prismatic joints. End-effector deflection and the estimates of the applied forces are calculated by using overall Jacobian and task stiffness matrices calculated previously. Desired task space velocities of the holonomic platform are calculated by applying estimated forces to the desired admittance. Pseudo-inverse of the Jacobian of the holonomic platform is utilized to calculate the desired joint velocities, since there Mecanum wheeled mobile platform with four actuators is a redundant mechanism in plane. Finally, a PI controller regulates the holonomic platform to follow these desired velocity trajectories. It is to be noted that the forces applied to the compliant mechanism also act on the holonomic platform, under the assumption that the compliant mechanism behaves an ideal spring.

Experimental verification of force sensing utilizing the compliant 3-PaRR mechanism and representative usability studies with the mobile platform implementation according to the present invention can be realized as follows:

In order to verify the force sensing fidelity of compliant element, a test-bed is prepared such that force estimates of the compliant mechanism can be compared to commercial 6-axis ATI Nano17 force/torque sensor. In particular, the forces/torque applied to the compliant mechanism are estimated using end-effector stiffness and measurements of the defection of the grounded parallelograms of the compliant 3-PaRR mechanism. Given the deflections of the grounded links, the end-effector deflections are calculated using the forward kinematics. FIG. 5 presents the measurements of the force sensor along with the force estimates through the compliant element along x, y and θ directions, respectively. Results indicate that force estimates through the compliant element can track the applied forces quite well as long as the applied forces are below some threshold. In particular, force estimates have about 10% error compared to a high precision force sensor, with RMS errors of $e_{fx}=1.7$ N, $e_{fy}=2.2$ N and $e_{r\theta}=2.7$ Nmm. It is to be noted that, as the applied forces are increased, the error in the force estimates increases. Such an error is expected, since the analysis of the compliant mechanism strongly depends on small deflection assumption.

For usability studies of the implementation of the present invention, a virtual tunnel, which is shown in dashed lines, is implemented by introducing virtual walls at ±50 mm from the x-axis, defining forbidden regions in the task space of the mobile platform. The virtual tunnel is a straight corridor with 100 mm width and 700 mm height. FIG. 6 presents experimental results, where the path followed by the robot is depicted along with the forces applied by the patient. From the representative experimental results, it can be observed that the movement of the mobile robot closely follows the forces applied at the end-effector. Moreover, whenever the patient reaches the boundary of the virtual tunnel, the controller pushes the robot inside the tunnel, successfully implementing virtual fixtures. Finally, the robot is highly backdriveable and can easily be directed with small forces.

A 3-DoF, series elastic, portable, mobile haptic interface has been developed to deliver home based rehabilitation therapies and to administer range of motion/strength measurements for the upper extremity. Feasibility tests and preliminary usability studies have been conducted and the efficacy of the device on assisting movements of the arm has been demonstrated. Experience with the device suggests that the device is ergonomic and easy to use.

In a nutshell, the implementation according to the present invention is a portable/mobile device for assisting physical rehabilitation and evaluating patient performance. It consists of a mobile platform, a compliant element and a control algorithm or more specifically consists of a multi-degree of freedom mobile platform and a multi degree of freedom compliant element and a control algorithm. Human limb (arm or leg or parts of them) is attached to the system through the compliant element while mobile platform supports and moves the limb.

The mobile platform according to the present invention performs movement on any given plane, acting as a multi degrees of freedom actuator on plane with unlimited translational and rotational workspace such that the device works on different planes. Deflections of the compliant element are measured though a position sensing unit and given the stiffness of the compliant element, these measurements are mapped to forces applied by the limb. The control algorithm inputs the force estimations (or deflections of the compliant element) and moves the mobile platform according to the forces applied. The motion of the mobile platform is measured; hence, human limb movements can also be measured and estimated.

The device of the present invention can control the interaction force between the human and the mobile platform. It can move the limb when the patient is passive such that motions are imposed to the limb or the patient can steer the device as desired when the control algorithm is in place. The device can accordingly assist the limb as needed to help him/her complete the task. The device can also resist the patient to impose forbidden regions in the workspace.

It is to be noted that the device can work together/synchronized with a computer, can assist/resist patients during therapeutic video games or with Virtual Reality applications. In a preferred embodiment according to the invention, a holonomic mobile platform (a platform that can move towards any direction at any time) using 4 Mecanum wheels are used for the mobile platform. It is to be noted that many other implementations are possible, for example with 3 (or more) omni-directional wheels, 2 (or more) steered and driven wheels. The principle of the invention may also work with non-holonomic mobile platforms.

In the preferred embodiment according to the invention, a monolithic compliant flexure for the compliant element is used. A planar parallel mechanism is also used due to its underlying kinematics; however, many other implementations can be equally effective by for instance serial or parallel kinematic chains. Any compliant element with multi degrees of freedom will do as long as the end effector deflections can be measured/estimated.

The stiffness of the compliant element is orders of magnitude less stiff than a classical force sensor and as a result while controlling the interaction force, the control gains can be selected orders of magnitude larger than the gains that could be selected with a force sensor. Larger controller gains mean better control performance and robustness.

The invention claimed is:

1. A series elastic holonomic mobile platform for home-based administration of table-top therapeutic physical rehabilitation exercises to patients and evaluation of patient performance during such exercises, said mobile platform being provided as a multi degree-of-freedom (DoF) mobile platform comprising a multi-DoF compliant mechanism and a control unit;
wherein said multi-DoF mobile platform comprises at least three actuated Mecanum wheels and said multi-DoF compliant mechanism is provided as a force sensing unit in the form of a compliant planar multi-DoF series elastic element,
wherein said compliant mechanism operates such that in-plane forces and torque acting on are determined by measuring deflection of said compliant mechanism by means of position sensors whereby the non-backdriveable active holonomic platform operates as a multi-DoF series elastic actuator, and
wherein said mobile platform is associated with an at least 3-DoF planar, compliant parallel mechanism coupled to an omni-directional Mecanum-wheeled mobile robot.

2. The series elastic holonomic mobile platform of claim 1 wherein said mobile platform possesses 3 DoF in the form of 2 DoF translations and 1 DoF rotation to sustain all possible planar movements.

3. The series elastic holonomic mobile platform of claim 1 wherein said compliant mechanism is a compliant parallelogram (Pa) mechanism.

4. The series elastic holonomic mobile platform of claim 1 wherein said compliant mechanism is provided as a planar 3-PaRR parallel mechanism.

5. The series elastic holonomic mobile platform of claim 1 further comprising a base link and wherein the position of output of said compliant mechanism is measured with respect to said base link.

6. The series elastic holonomic mobile platform of claim 1 wherein revolute joints of said compliant mechanism are designed as filleted V-shaped flexure hinges.

7. The series elastic holonomic mobile platform of claim 5 wherein the position of the output links of three grounded parallelogram mechanisms acting as prismatic joints are measured.

8. The series elastic holonomic mobile platform of claim 7 wherein the position of the output links of three grounded parallelogram mechanisms are measured while other revolute joints are passive.

9. The series elastic holonomic mobile platform of claim 7 wherein an end-effector of the compliant mechanism is provided such that spherical rollers are attached to bottom side of the end-effector of the compliant mechanism and said rollers are constrained to a planar surface of the holonomic platform from top to counter-balance out-of-plane forces and moments applied by patients.

10. The series elastic holonomic mobile platform of claim 9 wherein forces applied to the end-effector of said compliant mechanism result in displacements measured by linear encoders attached to prismatic joints and end-effector deflection and estimates of the applied forces are calculated.

11. The series elastic holonomic mobile platform of claim 6 wherein corners of V-shaped cut-outs are filleted by a fixed angle.

12. The series elastic holonomic mobile platform of claim 6 wherein each filleted V-shaped flexure hinge is designed to have 2.75° maximum angular deflection and 1 Nm/rad joint stiffness.

13. The series elastic holonomic mobile platform of claim 4 wherein forces/torque applied to the compliant mechanism are estimated using end-effector stiffness and measurements of the defection of grounded parallelograms of the compliant 3-PaRR mechanism.

* * * * *